US011831702B2

(12) United States Patent
Tran Thai et al.

(10) Patent No.: US 11,831,702 B2
(45) Date of Patent: Nov. 28, 2023

(54) METHOD FOR BROADCASTING DASH/HLS HYBRID MULTIMEDIA STREAMS

(71) Applicant: EEXPWAY, Cesson Sevigne (FR)

(72) Inventors: Tuan Tran Thai, Toulouse (FR); Christophe Burdinat, Lyons (FR); Cédric Thienot, Paris (FR)

(73) Assignee: EEXPWAY, Cesson Sevigne (FR)

( * ) Notice: Subject to any disclaimer, the term of this patent is extended or adjusted under 35 U.S.C. 154(b) by 0 days.

(21) Appl. No.: 17/766,209

(22) PCT Filed: Oct. 2, 2020

(86) PCT No.: PCT/IB2020/059251
§ 371 (c)(1),
(2) Date: Apr. 1, 2022

(87) PCT Pub. No.: WO2021/064664
PCT Pub. Date: Apr. 8, 2021

(65) Prior Publication Data
US 2023/0045170 A1 Feb. 9, 2023

Related U.S. Application Data

(60) Provisional application No. 62/910,834, filed on Oct. 4, 2019.

(51) Int. Cl.
*H04L 67/02* (2022.01)
*H04L 65/611* (2022.01)
*H04L 69/04* (2022.01)

(52) U.S. Cl.
CPC ............ *H04L 67/02* (2013.01); *H04L 65/611* (2022.05); *H04L 69/04* (2013.01)

(58) Field of Classification Search
CPC .......... H04N 21/26258; H04N 21/2668; H04L 67/02; H04L 65/612
See application file for complete search history.

(56) References Cited

U.S. PATENT DOCUMENTS 10,931,993 B2 * 2/2021 Nilsson .............. H04N 21/2662
2014/0229529 A1    8/2014 Barone et al.
(Continued)

FOREIGN PATENT DOCUMENTS

EP    2826267 A1 *  1/2015  .............. G06F 11/08
EP    3383054 A1    10/2018

OTHER PUBLICATIONS

International Search Report and Written Opinion of the International Searching Authority dated Dec. 15, 2020, in connection with International Application No. PCT/IB2020/059251, 12 pages.
(Continued)

*Primary Examiner* — Chirag R Patel (57) ABSTRACT

A method for multicasting multimedia content to receivers, the method comprising: receiving, by a multicast middleware (MCMF) from a server (BMS), manifest files to access contents according to different adaptive bitrate streaming communication protocols, one of the manifest files being consistent with the MPEG-DASH protocol and describing media segments of a content, another of the manifest files being a master playlist consistent with the HLS protocol and defining locations where media playlists to access the media segments of the content are available; receiving, by the middleware from the server, the media segments of the content, transmitted in a multicast session, receiving, by the middleware from the server, the playlists, the received playlists referencing the media segments transmitted in the multicast session, and currently received by the middleware; and storing by the middleware the manifest files, the media segments and the playlists, to make them available to receivers (UD, UD1, UD2).

12 Claims, 4 Drawing Sheets

(56) References Cited

U.S. PATENT DOCUMENTS

| | | | |
|---|---|---|---|
| 2015/0081838 A1* | 3/2015 | Stockhammer | H04L 67/10 709/217 |
| 2018/0084018 A1 | 3/2018 | Arky | |
| 2019/0075545 A1* | 3/2019 | Praturi | H04W 72/51 |
| 2020/0021867 A1* | 1/2020 | Park | H04N 21/6405 |
| 2020/0053435 A1* | 2/2020 | Denoual | H04N 21/23439 |
| 2020/0077161 A1* | 3/2020 | Lohmar | H04N 21/8456 |

OTHER PUBLICATIONS

Stockhammer, "Presentation on MPEG Common Media Application Format," DVB Technical Module Meeting—TM5370, Jun. 16, 2016, 26 pages.

* cited by examiner

METHOD FOR BROADCASTING DASH/HLS HYBRID MULTIMEDIA STREAMS

CROSS REFERENCE TO RELATED APPLICATIONS

This application is a 371 National Stage of International Application No. PCT/IB2020/059251, filed Oct. 2, 2020, which claims the benefit of Provisional Application No. 62/910,834, filed Oct. 4, 2019, the disclosures of which are herein incorporated by reference in their entirety.

TECHNICAL FIELD

The present invention relates to the broadcast of multimedia streams between a server and one or more user devices, for streams which can be simultaneously described as MPEG-DASH service [1] and HLS service [2].

BACKGROUND

To transmit multimedia content over HTTP (Hypertext Transfer Protocol) in point-to-point mode, and in particular live video content, several adaptive bitrate streaming communication protocols have been specified [1], [2], which all work by breaking the content into a sequence of small file segments. Each segment contains a short interval of playback time of content. These segments are made available over HTTP, and their sequence is described by a manifest. Based on the manifest a media player determines the location of the next segments to be played and requests them over HTTP. These protocols may describe several alternative streams with different bitrate or renditions (representations), allowing the media player to select the stream the more adapted to the network conditions or to the device capabilities. One of these streaming communications is the MPEG-DASH standard (Moving Picture Experts Group-Dynamic Adaptive Streaming over HTTP) [1]. Another one is HLS (HTTP Live Streaming) [2].

These protocols can describe the same sequence of segments, if they use the same video encoding, the same media format and the same cipher. A new standard, CMAF (Common Media Application Format) [3], proposes to use MP4 as video format based on the format ISO BMFF (International Standardisation Organisation-Base Media File Format), supported both by MPEG-DASH and HLS. This way the same sequences of segments can be described both by MPEG-Dash manifest (Media Presentation Description—MPD) and HLS manifest (media playlist). Such content is called a hybrid DASH/HLS content. Usage of hybrid services aims to reduce costs at content publisher, while addressing a heterogeneous park of devices and media players.

The MBMS (Multimedia Broadcast Multicast Service) multimedia content broadcast or point-to-multipoint service was developed to distribute a same multimedia content in mobile networks to a large number of users. The transport of MPEG-DASH content over MBMS has been standardized at 3GPP [4]. Over MBMS, MPEG-DASH segments are transported with the FLUTE protocol (File deLivery over Unidirectional Transport) [5], and the MPEG-DASH manifest, the MPD, is included within the service metadata provided by the user service announcement. The user devices regularly listen to the user service announcement to get the latest version of user service metadata. For a MPEG-DASH service, if a new version of the MPD needs to be quickly delivered, the MPD is delivered "in-band", i.e. sent as an additional file within the FLUTE session delivering the media segments.

Similarly, the transport of MPEG-DASH content over IP (Internet Protocol) multicast network is specified at DVB (Digital Video Broadcasting) [6], making use either of the FLUTE protocol, or the ROUTE protocol (Real-time Object delivery over Unidirectional Transport) [7].

In both specifications from 3GPP and DVB, the network announces the list of available content over multicast and the required metadata needed to initiate their reception. For MBMS these metadata are called the MBMS user service announcement and may also been delivered over multicast.

HLS provides two kinds of manifests: master playlist, and media playlist.

The master playlist provides the list of alternative streams of the service with the location of the associated media playlist for each of those streams.

The media playlist lists the latest available segments of a given stream. Media playlists for live content are updated each time a new segment is generated. In some cases, the video decoder may have to be initialized with initialization segments, which carry information required to initialize the video decoder. The reference to the initialization segments is also given in the media playlist.

It is desirable to allow the transport of a hybrid DASH/HLS content over multicast (over MBMS or an IP multicast network). To this purpose, several constraints should be addressed:
  Transport of a hybrid DASH/HLS content over multicast must be backward compatible with old devices consuming the content as DASH over multicast.
  Update of the HLS media playlist information must be delivered every time a new segment is delivered.
  The media playlists as seen by the player shall only reference available segments. As the delivery over broadcast creates an additional delay, only media playlist listing well-received segments should be exposed to the media player.

SUMMARY

A method is described for multicasting multimedia content to receivers. The method may include: receiving, by a multicast middleware from a server, manifest files to access contents according to different adaptive bitrate streaming communication protocols, one of the manifest files being consistent with the MPEG-DASH protocol and describing media segments of a content, another of the manifest files being a master playlist consistent with the HLS protocol and defining locations where media playlists to access the media segments of the content are available; receiving, by the middleware from the server, the media segments of the content, transmitted in a multicast session; receiving, by the middleware from the server, the playlists, the received playlists referencing the media segments transmitted in the multicast session, and currently received by the middleware; and storing by the middleware the received manifest files, the received media segments and the received playlists, to make them available to receivers coupled to the middleware.

The delivery of such a hybrid DASH/HLS content over multicast network allows the network operator to save multicast resources.

According to an embodiment, the multicast session is performed according the FLUTE or ROUTE protocol.

According to an embodiment, the playlists are transmitted to the middleware over HTTP in unicast.

According to an embodiment, the playlists are transmitted to the middleware in the multicast session.

According to an embodiment, the playlists are transmitted to the middleware in a multicast session distinct from the multicast session in which the media segments are transmitted.

According to an embodiment, the media segments of the media content are transmitted to the middleware with a file delivery table, in a FLUTE session according to the FLUTE protocol, the file delivery table including segment attributes referencing a last transmitted media segment in the FLUTE session, the method further comprising generating by the middleware from the segment attributes in the FDT a playlist referencing the last media segments received by the middleware.

According to an embodiment, the file delivery table references initialization segments of the media content, the initialization segments containing information required to initialize a media decoder of the receivers.

According to an embodiment, the method further comprises: receiving, by the middleware, metadata fragments announcing a media content divided into media segments, the metadata fragments including a first user service bundle description fragment referencing other metadata fragments including a media presentation description fragment referencing the media segments of the content, and initialization segments containing information required to initialize a media decoder in the receivers; and receiving, by the middleware, a second user service bundle description fragment referencing the same metadata fragment as the first user service bundle description fragment except the media presentation description fragment which is replaced with a reference to the master playlist referencing the media playlists, the media playlists referencing last media segments already received by the middleware, the received metadata fragments being used for announcing to the receivers delivery of the content according to MPEG/DASH and HLS protocols over MBMS service.

According to an embodiment, the method further comprises: receiving, by the middleware, metadata fragments announcing a media content divided into media segments, the metadata fragments including a user service bundle description fragment referencing other metadata fragments including a media presentation description fragment referencing the media segments of the content and initialization fragments containing information required to initialize a media decoder in the receivers, and a master playlist referencing media playlists and containing information required to initialize a media decoder in the receivers, the media playlists referencing last media segments already transmitted to receivers, the received metadata fragments being used, for announcing to the receivers delivery of the media content according to MPEG/DASH and HLS protocols over MBMS service.

According to an embodiment, a structure of the user service bundle description fragment is defined by a XML schema which is extended to reference a MPEG-DASH manifest file and a HLS master playlist.

According to an embodiment, the prepared metadata fragments are transmitted to the middleware over an IP network.

Embodiments may also relate to a multicast middleware configured to implement the method as above-described.

According to an embodiment, the multicast middleware is configured to be implemented in the receivers or in a gateway connected to one or more of the receivers.

Figure 1:
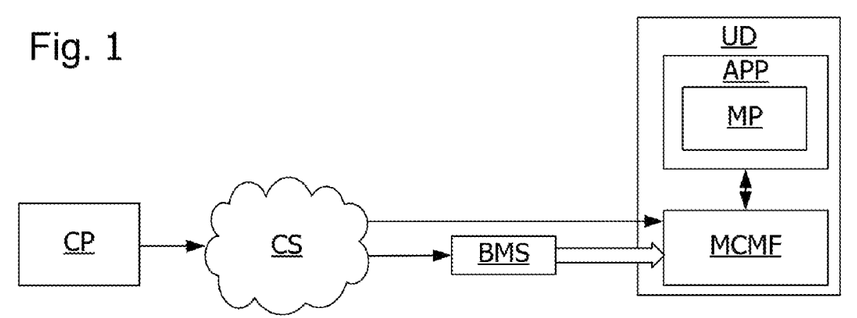
FIG. 1 is a block diagram of a system transmitting multimedia content between a content provider and user devices.
Figure 2:
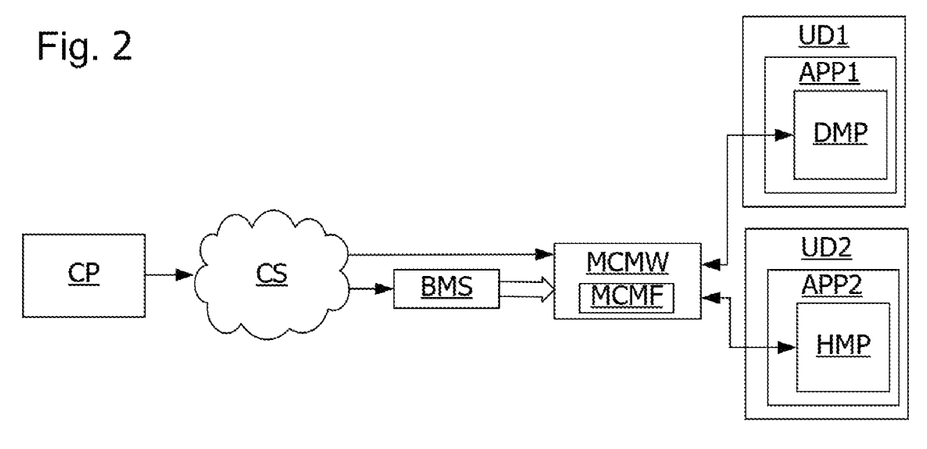
FIG. 2 is a block diagram of another system transmitting multimedia content between a content provider and user devices.

FIGS. 1 and 2 illustrate systems providing broadcast or multicast streaming and/or file delivery services of multimedia data. FIG. 1 more particularly illustrates a Multimedia Broadcast Multicast Service (MBMS). FIG. 2 more particularly illustrates services of multimedia data over fixed broadband network (e.g. DOCSIS) or over satellite network. The systems of FIGS. 1 and 2 comprise one or more content packagers CP, one or more content servers CS, one or more broadcast servers BMS implementing a multicast server function such as MBMS or eMBMS service. Each broadcast server BMS is connected to one of the content servers CS. One of the servers broadcast BMS multicasts multimedia content according to MPEG-DASH and HLS. The content packagers CP and content servers CS transmit contents using the protocol delivery over HTTP.File Delivery services may concern services for downloading a single file or a set of files accessible from a common base URL, e.g. an HTML page of a web service.

In FIG. 1, Each of the user devices UD is connected to one of the broadcast servers BMS via a mobile or fixed network. One or more user devices UD gets a content (MPEG-DASH or HLS) from a broadcast server BMS through a Multicast Middleware function MCMF, the content being broadcasted or multicasted by the broadcast server BMS.

In FIG. 2, each of the user devices UD1, UD2 are linked to one of the broadcast servers BMS via a fixed or satellite network. One or more user devices UD1, UD2 get a content (MPEG-DASH or HLS) from a broadcast server BMS through a gateway MCMW performing the function of Multicast Middleware, using a unicast connection (e.g. Wi-Fi, wired cable), the content being broadcasted or multicasted by the server broadcast BMS.

In the example of FIG. 2, a user device UD1 has an application APP1 including a media player DMP implementing the protocol MPEG-DASH, and a user device UD2 has an application APP2 including a media player HMP implementing the protocol HLS.

In both the architectures illustrated in FIGS. 1 and 2, the multicast middleware function MCMF implemented in the user devices UD or in the gateway MCMW stores the received media segments and manifest files on a local cache, accessible to media player(s) MP, DMP, HMP of applications APP, APP1, APP2 installed in the user devices, and the local cache acts as a HLS or MPEG-DASH server, i.e. responds to HTTP requests to transmit the received manifest files and media segments stored in the local cache, the media segments being stored in locations as described by the manifest files.

In addition, the multicast middleware function MCMF can indicate to the application APP, APP1, APP2 that hybrid MPEG-DASH/HLS contents are available in both protocols MPEG-DASH and HLS. When the application APP, APP1, APP2 wants to consume one of these contents using one protocol, it can interact with the multicast middleware function MCMW to initiate the reception of this particular content. The multicast middleware function MCMW then provides to the application APP, APP1, APP2 a local URL to access the manifest file for the requested protocol (the MPD URL for MPEG-DASH, the master playlist URL for HLS).

Figure 3:
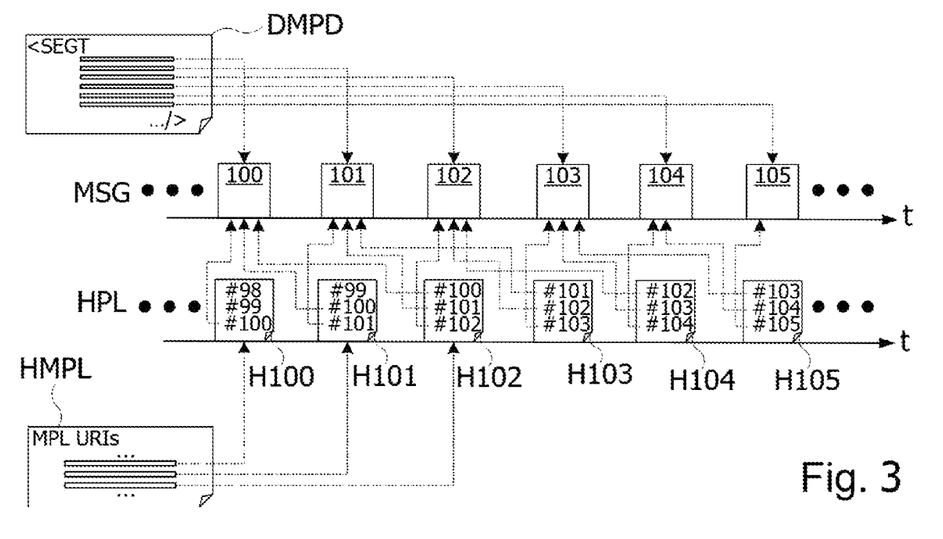
FIG. 3 shows a sequence of media segment described both a DASH MPD manifest and HLS playlists, according to an embodiment.

FIG. 3 illustrates a hybrid MPEG-DASH/HLS content delivery service over MBMS, according to an embodiment. FIG. 3 shows media segments MSG numbered from 100 to 105 which are transmitted in a FLUTE session through a multicast network. A DASH MPD manifest is transmitted to the DASH compliant user devices UD1 (including a DASH player DPL). The DASH MPD manifest includes segments templates SEGT describing each transmitted segments MSG, e.g. 100-105 and containing a uniform resource location or identifier (URI) of each transmitted segment. A HLS master playlist HMPL is transmitted to the HLS compliant user devices UD2 (including a HLS player HMP). The HLS master playlist HMPL also includes a location (URI) of each HLS media playlist HPL (H100-H105) to be transmitted with the media segments MSG, and each HLS media playlist H100-H105 includes respective locations or uniform resource identifiers (URIs) of last transmitted segments MSG. In the example of FIG. 3, the playlist H100 which is transmitted after the segment 100 includes the locations of the three previously transmitted segments 98, 99 and 100, the playlist H101 includes the locations of the three previously transmitted segments 99, 100 and 101, etc.

The number of segment locations in a HLS media playlist HPL is defined by a parameter that may be specified by the content server CS.

Figure 4:
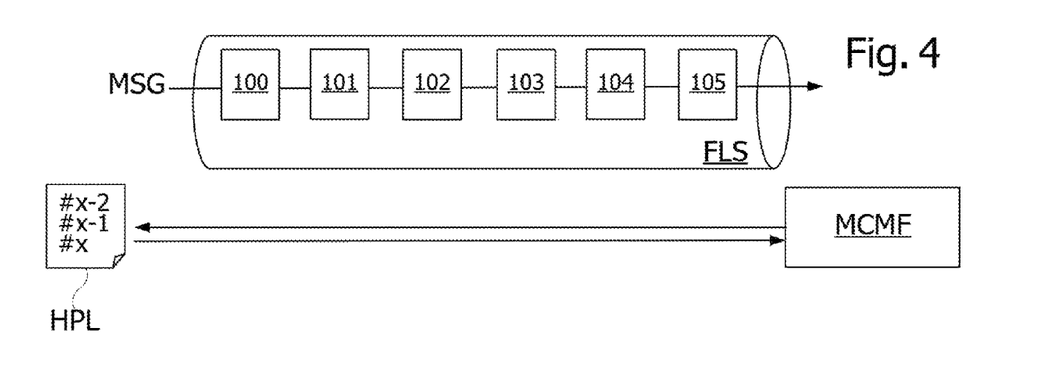
FIG. 4 illustrates a segment delivery mode according an embodiment.

In a first embodiment illustrated in FIG. 4, the broadcast server BMS delivers the media segments MSG in a FLUTE session, whereas the media playlists HPL are available over HTTP. The user device UD, UD1, UD2 needs to request updates of the media playlist HPL over HTTP in unicast to the content server CS, while the broadcast server BMS delivers the segments over multicast in the FLUTE session FLS. While backward compatibility is guaranteed, this solution forces the user devices UD2 hosting HLS media player HMP to have a point to point connection. In particular, the mobile user devices would have to stay in a connected state, which consumes batteries, and the traffic over unicast consumes more network resources than the other embodiments.

Figure 5:
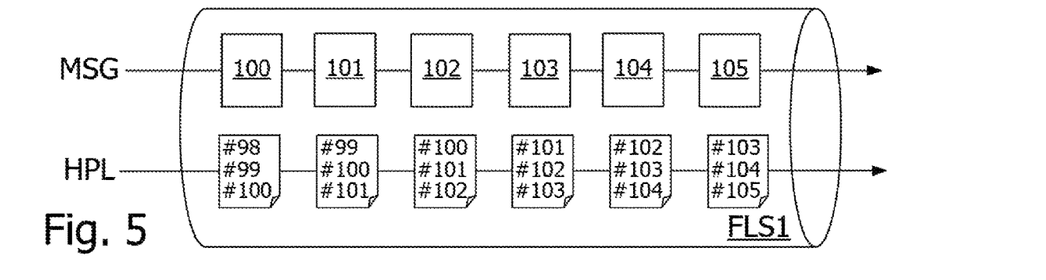
FIG. 5 illustrates a segment delivery mode according another embodiment.

In a second embodiment illustrated in FIG. 5, the broadcast server BMS delivers the media playlists HPL together with the media segments MSG in a same FLUTE session FLS1. Updates of the media playlists MPL are delivered within the same FLUTE session FLS1 delivering the content. Each media segment MSG is sent before sending the first media playlist HPL referencing the media segment MSG.

A playlist expiration is managed as follows: if a playlist update is missed, the user device UD shouldn't keep an old version, and should instead request a new playlist HPL over unicast to the content server CS. As the media playlist is a small file, it is much more sensitive to loss. To increase reception robustness, its rate of FEC (Forward Error Correction) may have to be adjusted, or the playlist HPL could be transmitted several times.

The media playlist HPL is transmitted as an additional file within the FLUTE session FLS1. When a new segment MSG is generated by the video packager CP in the content server CS, the segment is broadcasted together with the updated media playlist HPL including this segment MSG.

To avoid keeping in cache an old version of the media playlist HPL by the user device UD, a cache-control directive can be used, including an expiration date (7.2.10.5 3GPP FDT Extensions in 3GPP TS 26.346). MD5 (Media Digest 5) of the media playlist file HPL can be also be indicated in a File Delivery Table (FDT) (7.2.9 Signaling of Parameters with FDT Instances of TS 26.346: Content-MD5 represents a digest of a transport object. A file server providing the transport object as a file indicates the MD5 hash value whenever multiple versions of the file are anticipated for the download session. Other versioning information may be carried (such as a version number, or another cryptographic hash function).

Figure 6:
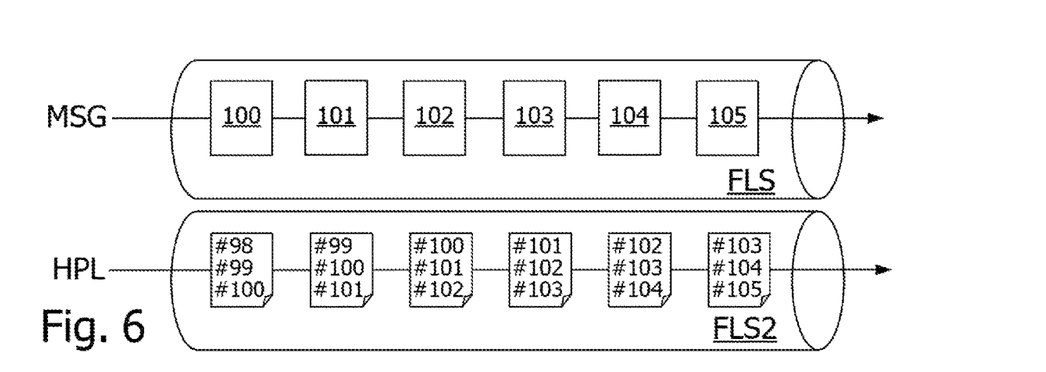
FIG. 6 illustrates a segment delivery mode according another embodiment.

In a third embodiment illustrated in FIG. 6, the broadcast server BMS delivers the media segments MSG in the FLUTE session FLS, whereas the media playlists HPL are delivered in another FLUTE session FLS2. The content of the FLUTE session FLS delivering the segments MSG is unchanged, the secondary FLUTE session FLS2 being used for the media playlists HLS. The broadcast server BMS sends each media segment MSG in the FLUTE session FLS before sending the first media playlist HPL referencing the media segment in the FLUTE session FLS2. Description of this new session is added in the MBMS user service announcement or in the Multicast session configuration, as specified by DVB.

In the first, second and third embodiments (FIGS. 4, 5, 6), as the media playlists HPL, as seen by the player DPL, HPL of the user device UD, UD1, UD2, only reference available segments MSG, a new media playlist HPL should be broadcasted once the delivery of the corresponding new segment is achieved. Alternatively, the multicast middleware function MCMF could check the good reception of the new segment MSG before exposing the corresponding media playlist to the media player MPL.

In all the previous embodiments, the FLUTE sessions FLS, FLS1, FLS2 are multicast sessions that can alternatively implemented using the ROUTE protocol.

Figure 7:
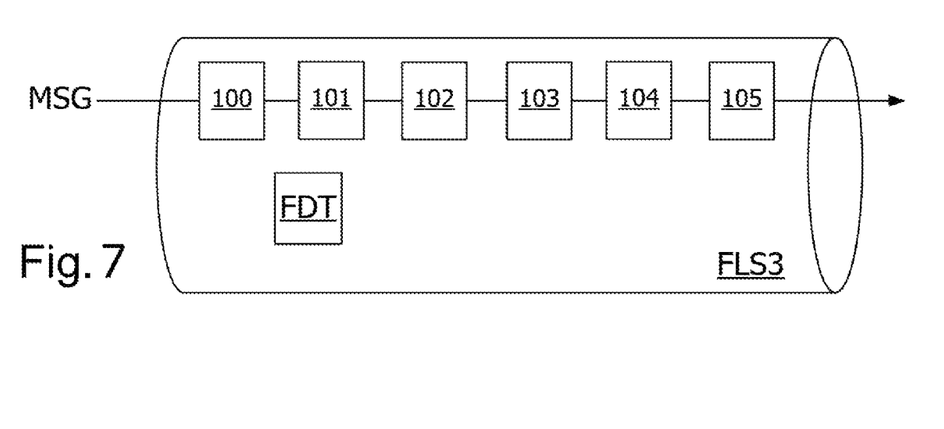
FIG. 7 illustrates a segment delivery mode according another embodiment.

In a fourth embodiment illustrated in FIG. 7, the media playlists HPL are not delivered separately but their content transported directly within the file delivery table FDT which also transmitted within the FLUTE session transmitting the segments MSG. Thus the table FDT also includes segment attributes (duration, rendition, number and possibly other attributes) of the segment currently delivered in the corresponding FLUTE session. According to the fourth embodiment, a dedicated extension to the xml (eXtended Markup Language) schema of the FDT indicates the segment attributes of the segment delivered in the corresponding FLUTE session, these attributes being normally provided in the HLS media playlist HPL. An extension "<HLS extension>" can be inserted into the FDT as follows:

```
..........<file segment #100
................segment attributes
................<HLS extension >
..........<file/>
```

The media playlist HPL is reconstructed by the middleware function MCMF of the user device UD or the gateway MCMW based on the received table FDT. An internal parameter of the middleware function MCMF defines the number of the last segments MSG to be listed in the reconstructed media playlist HPL. An expiration date of the reconstructed media playlist HPL can be computed based on the duration of the latest listed segment. If there are some initialization segments IMSG, their references could be carried in the FDT extension <HLS extension>, or retrieved from the MPD, so that they can be included in the reconstructed media playlist HPL.

Figure 8:
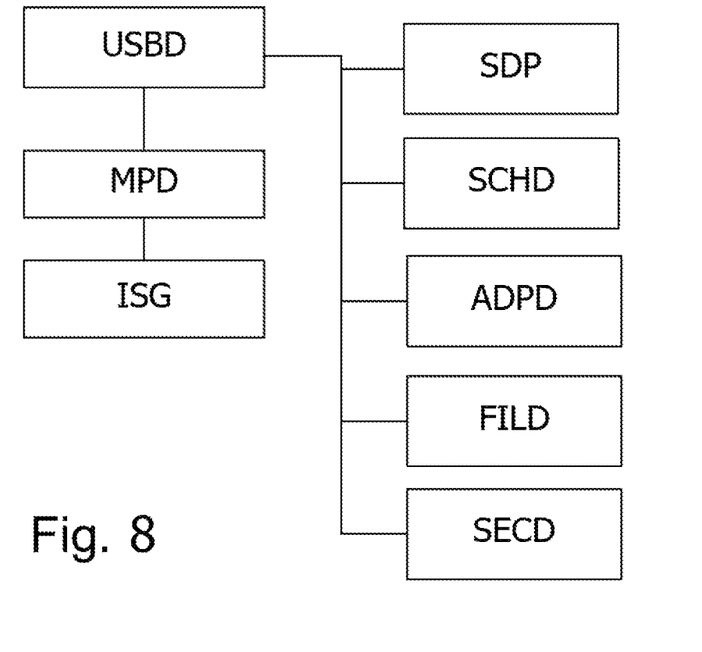
FIG. 8 illustrates a MBMS user service announcement service, according to an embodiment.

A MBMS user service announcement service announces MPEG-DASH content delivered over MBMS to the user devices UD, UD1, UD2, using a service announcement channel (SACH). To this purpose, as shown in FIG. 8, the MBMS user service announcement gathers the metadata of the delivered content in a set of metadata fragments including a user service bundle description fragment USBD to announce a DASH content. The fragment USBD provides, in particular, the references to other metadata fragments, i.e.:
- a session description protocol SDP, describing the FLUTE session where the media segments are delivered,
- a schedule description fragment SCHD, describing the delivery time window for the given content,
- a manifest or media presentation description file MPD of the DASH content,
- initialization segments ISG, containing information required to initialize the media decoder, and
- other fragments such as a security description fragment SECD, a filter description fragment FILD, an associated delivery procedure description fragment ADPD, . . . ).

Together with the reference to the manifest MPD, the fragment USDB can indicate a media type of the MPD ("application/dash+xml").

Figure 9:
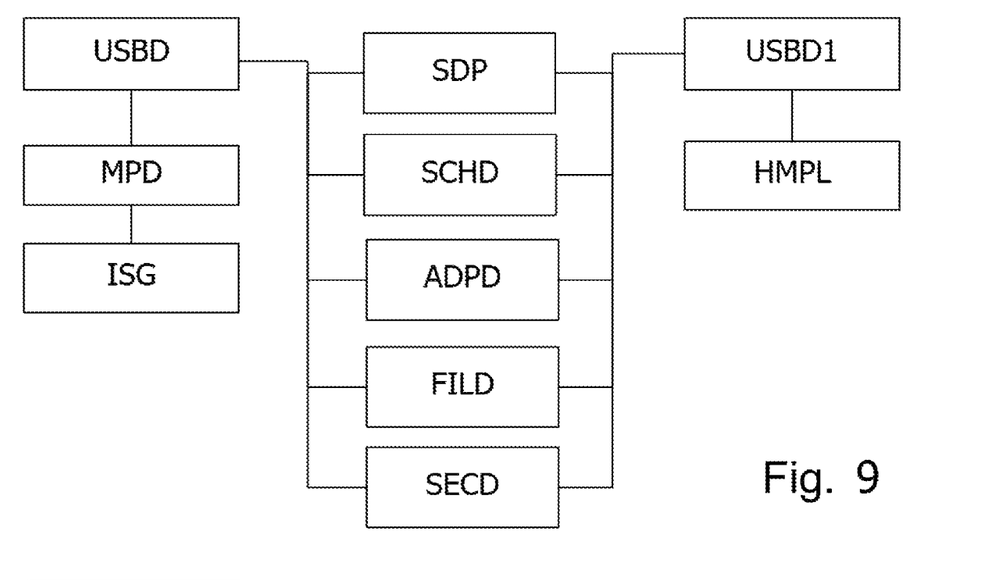
FIG. 9 illustrates a MBMS user service announcement service, according to another embodiment.

According to a first embodiment illustrated in FIG. 9, a hybrid DASH/HLS service over MBMS is announced by the server BMS by duplicating the user service bundle description fragment USBD. Thus, to announce a hybrid MPEG-DASH/HLS content over MBMS, the MBMS user service announcement implemented in the multicast broadcast server BMS:
- first prepares its metadata fragments to announce the content as a MPEG-DASH content,
- duplicates the USBD fragment (USBD1 fragment) within the user service announcement, and sets another service identifier,
- changes, in the duplicated fragment USBD1, the reference to the manifest MPD to the uniform resource identifier (URI) of the HLS master playlist HMPL with the appropriate media type,
- keeps the references to the other fragments unchanged, and
- adds the HLS master playlist HMPL as another metadata fragment.

Figure 10:
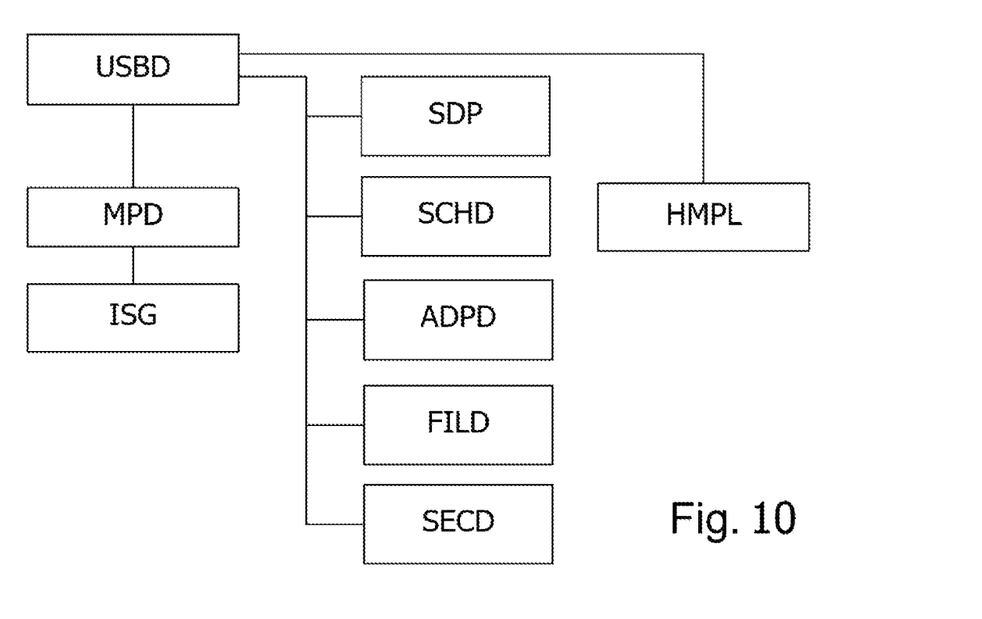
FIG. 10 illustrates a MBMS user service announcement service, according to another embodiment.

According to a second embodiment illustrated in FIG. 10, hybrid DASH/HLS service over MBMS is announced by the server BMS by extending the xml schema of the fragment USDB is to be able to reference two different manifests, one being the manifest MPD for DASH, the other being the HLS master playlist HMPL.

To announce a hybrid MPEG-DASH/HLS content over an IP network as specified by DVB, the same options are possible: either the full service description is duplicated (FIG. 9), or the schema for the multicast session configuration (fragment USBD) is extended.

CITATION LIST

[1] ISO/IEC 23009-1 Dynamic adaptive streaming over HTTP (DASH)
[2] IETF RFC 8216 HTTP Live Streaming
[3] ISO/IEC CD 23000-19 Common Media Application Format
[4] 3GPP TS 26.346 Multimedia Broadcast/Multicast Service (MBMS); Protocols and codecs
[5] IETF RFC 6726—FLUTE—File Delivery over Unidirectional Transport
[6] DVB Document A176 Digital Video Broadcasting (DVB); Adaptive media streaming over IP multicast
[7] ATSC A/331 Signaling, Delivery, Synchronization, and Error Protection

The invention claimed is:

1. A method for multicasting multimedia content to receivers, the method comprising:
   receiving, by a multicast middleware from a server, manifest files to access contents according to different adaptive bitrate streaming communication protocols, one of the manifest files being consistent with the MPEG-DASH protocol and describing media segments of a content, another of the manifest files being a master playlist consistent with the HLS protocol and defining locations where media playlists to access the media segments of the content are available;
   receiving, by the middleware from the server, the media segments of the content, transmitted in a multicast session;
   receiving, by the middleware from the server, the playlists, the received playlists referencing the media segments transmitted in the multicast session, and currently received by the middleware;
   receiving, by the middleware, metadata fragments announcing a media content divided into media segments, the metadata fragments including a first user service bundle description fragment referencing other metadata fragments including a media presentation description fragment referencing the media segments of the content, and initialization segments containing information required to initialize a media decoder in the receivers;
   receiving, by the middleware, a second user service bundle description fragment referencing the same metadata fragment as the first user service bundle description fragment except the media presentation description fragment which is replaced with a reference to the master playlist referencing the media playlists, the media playlists referencing last media segments already received by the middleware, the received metadata fragments being used for announcing to the receivers delivery of the content according to MPEG/DASH and HLS protocols over MBMS service; and
   storing by the middleware the received manifest files, the received media segments and the received playlists, to make them available to receivers coupled to the middleware.

2. The method of claim 1, wherein the multicast session is performed according to the FLUTE or ROUTE protocol.

3. The method according to claim 1, wherein the playlists are transmitted to the middleware over HTTP in unicast.

4. The method according to claim 1, wherein the playlists are transmitted to the middleware in the multicast session.

5. The method according to claim 1, wherein the playlists are transmitted to the middleware in a multicast session distinct from the multicast session in which the media segments are transmitted.

6. The method according to claim 1, wherein the media segments of the media content are transmitted to the middleware with a file delivery table (FDT), in a FLUTE session according to the FLUTE protocol, the file delivery table including segment attributes referencing a last transmitted media segment in the FLUTE session, the method further comprising generating by the middleware from the segment attributes in the FDT a playlist referencing the last media segments received by the middleware.

7. The method according to claim 6, wherein the FDT references initialization segments of the media content, the initialization segments containing information required to initialize a media decoder of the receivers.

8. A method for multicasting multimedia content to receivers, the method comprising:
  receiving, by a multicast middleware from a server, manifest files to access contents according to different adaptive bitrate streaming communication protocols, one of the manifest files being consistent with the MPEG-DASH protocol and describing media segments of a content, another of the manifest files being a master playlist consistent with the HLS protocol and defining locations where media playlists to access the media segments of the content are available;
  receiving, by the middleware from the server, the media segments of the content, transmitted in a multicast session;
  receiving, by the middleware from the server, the playlists, the received playlists referencing the media segments transmitted in the multicast session, and currently received by the middleware;
  receiving, by the middleware, metadata fragments announcing a media content divided into media segments, the metadata fragments including a user service bundle description fragment referencing other metadata fragments including a media presentation description fragment referencing the media segments of the content and initialization fragments containing information required to initialize a media decoder in the receivers, and a master playlist referencing media playlists and containing information required to initialize a media decoder in the receivers, the media playlists referencing last media segments already transmitted to receivers, the received metadata fragments being used, for announcing to the receivers delivery of the media content according to MPEG/DASH and HLS protocols over MBMS service; and
  storing by the middleware the received manifest files, the received media segments and the received playlists, to make them available to receivers coupled to the middleware.

9. The method of claim 1, wherein a structure of the user service bundle description fragment is defined by an XML schema which is extended to reference an MPEG-DASH manifest file and an HLS master playlist.

10. The method of claim 1, wherein the prepared metadata fragments are transmitted to the middleware over an IP network.

11. A non-transitory computer-readable medium carrying one or more sequences of instructions, which, when executed by one or more processors, causes the one or more processors to:
  receive, by a multicast middleware from a server, manifest files to access contents according to different adaptive bitrate streaming communication protocols, one of the manifest files being consistent with the MPEG-DASH protocol and describing media segments of a content, another of the manifest files being a master playlist consistent with the HLS protocol and defining locations where media playlists to access the media segments of the content are available;
  receive, by the middleware from the server, the media segments of the content, transmitted in a multicast session;
  receive, by the middleware from the server, the playlists, the received playlists referencing the media segments transmitted in the multicast session, and currently received by the middleware;
  receive, by the middleware, metadata fragments announcing a media content divided into media segments, the metadata fragments including a first user service bundle description fragment referencing other metadata fragments including a media presentation description fragment referencing the media segments of the content, and initialization segments containing information required to initialize a media decoder in the receivers;
  receive, by the middleware, a second user service bundle description fragment referencing the same metadata fragment as the first user service bundle description fragment except the media presentation description fragment which is replaced with a reference to the master playlist referencing the media playlists, the media playlists referencing last media segments already received by the middleware, the received metadata fragments being used for announcing to the receivers delivery of the content according to MPEG/DASH and HLS protocols over MBMS service; and
  store by the middleware the received manifest files, the received media segments and the received playlists, to make them available to receivers coupled to the middleware.

12. The non-transitory computer-readable medium of claim 11, wherein the instructions, when executed by the one or more processors, causes the one or more processors to implement the middleware in receivers or in a gateway connected to one or more of the receivers.

* * * * *